(12) United States Patent
Grumbine et al.

(10) Patent No.: US 8,157,876 B2
(45) Date of Patent: Apr. 17, 2012

(54) SLURRY COMPOSITION CONTAINING NON-IONIC POLYMER AND METHOD FOR USE

(75) Inventors: Steven Grumbine, Aurora, IL (US); Chul Woo Nam, Naperville, IL (US); William Ward, Glen Ellyn, IL (US); Ramasubramanyam Nagarajan, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 241 days.

(21) Appl. No.: 12/317,254

(22) Filed: Dec. 19, 2008

(65) Prior Publication Data

US 2009/0126713 A1 May 21, 2009

Related U.S. Application Data

(63) Continuation-in-part of application No. 11/888,264, filed on Jul. 31, 2007, now abandoned.

(51) Int. Cl.
*B24D 3/02* (2006.01)
*C09C 1/68* (2006.01)
*C09K 3/14* (2006.01)
*C09C 1/02* (2006.01)
*C10M 169/00* (2006.01)
*C10M 173/00* (2006.01)

(52) U.S. Cl. .............. 51/307; 106/3; 508/136; 508/143
(58) Field of Classification Search .............. 51/307; 106/3; 508/136, 143
See application file for complete search history.

(56) References Cited

U.S. PATENT DOCUMENTS

| 4,204,574 | A | 5/1980 | Stalder |
| 4,853,140 | A | 8/1989 | Payne et al. |
| 5,033,943 | A | 7/1991 | Durrum et al. |
| 5,611,681 | A | 3/1997 | Everitt |
| 5,693,596 | A * | 12/1997 | Kaburagi et al. ............. 508/143 |
| 5,817,711 | A | 10/1998 | Kambe et al. |
| 6,383,991 | B1 | 5/2002 | Hashimoto et al. |
| 6,602,834 | B1 * | 8/2003 | Ward et al. ............. 508/506 |
| 6,673,754 | B1 | 1/2004 | Nabeshima et al. |
| 7,195,542 | B2 * | 3/2007 | Hammer et al. ............. 451/8 |
| 7,585,340 | B2 * | 9/2009 | Dysard et al. ............. 51/298 |
| 2003/0100455 | A1 | 5/2003 | Oishi et al. |
| 2006/0075687 | A1 | 4/2006 | Tsuruta et al. |
| 2006/0249134 | A1 | 11/2006 | Kawasaki et al. |
| 2008/0057833 | A1 * | 3/2008 | Bakshi et al. ............. 451/37 |
| 2008/0102735 | A1 | 5/2008 | Bakshi et al. |

FOREIGN PATENT DOCUMENTS

| CA | 2150856 | * | 12/1995 |
| | (ABSTRACT) | | |
| CA | 2150856 (CLAIMS) | * | 12/1995 |
| CA | 2150856 (SPEC) | * | 12/1995 |
| EP | 0686684 A1 | | 12/1995 |
| JP | 04-216897 | | 8/1992 |

* cited by examiner

*Primary Examiner* — Shuangyi Abu Ali
(74) *Attorney, Agent, or Firm* — Thomas E. Omholt; Robert J. Ross; Steven D. Weseman

(57) ABSTRACT

A wiresaw cutting fluid composition of the present invention comprises about 25 to about 75% by weight of a particulate abrasive suspended in an aqueous carrier containing a polymeric viscosity modifier that comprises a polymer including a majority of non-ionic monomer units (preferably 100 mol % non-ionic monomer units), has a number average molecular weight ($M_n$) of at least about 5 kDa, and is present in the composition at a concentration sufficient to provide a Brookfield viscosity for the composition in the range of about 50 to about 1000 cP, e.g., 50 to about 700 cP, at about 25° C. at a spindle rotation rate of about 60 rpm. In one embodiment, the viscosity modifier comprises a polymer having a weight average molecular weight ($M_w$) of at least about 200 kDa. When a viscosity modifier of 200 kDa or greater $M_w$ is utilized, a preferred wiresaw cutting method the cutting fluid is circulated and applied by pumps and nozzles operating at a relatively low shear rate of not more than about $10^4$ s$^{-1}$.

38 Claims, No Drawings

SLURRY COMPOSITION CONTAINING NON-IONIC POLYMER AND METHOD FOR USE

CROSS-REFERENCE TO RELATED APPLICATIONS

This application is a continuation-in-part of U.S. application Ser. No. 11/888,264, filed on Jul. 31, 2007, which is incorporated herein by reference in its entirety.

FIELD OF THE INVENTION

The present invention relates to wiresaw cutting fluid compositions and methods. More particularly, the present invention relates to aqueous wiresaw cutting fluid slurries and methods of use thereof.

BACKGROUND OF THE INVENTION

Wire sawing is the dominant method for generating the thin substrates of semiconductor materials that are generally referred to as "wafers." Semiconductor wafers are essential to the integrated circuit and photo-voltaic industries, which can more generally be referred to as the solid-state electronics industry. Common substrate materials subjected to "wafering" include silicon, sapphire, silicon carbide, aluminum nitride, tellurium, silica, gallium arsenide, indium phosphide, cadmium sulfide, germanium, zinc sulfide, gray tin, selenium, boron, silver iodide, and indium antimonide, among other materials.

A typical wire sawing process involves drawing a wire across a mass of substrate material or workpiece, which in its unwafered state is commonly referred to as a boule or an ingot. The wire typically comprises one or more of a metal or alloy such as steel. A cutting fluid is applied to the wiresaw in the area where cutting is being conducted. The cutting fluid cools and lubricates the wire and workpiece. A particulate abrasive is typically included in the cutting fluid to increase the efficiency of the cutting. The abrasive is generally selected based on the hardness of the substrate being cut, which harder abrasives being used for harder substrates.

Cutting fluids can be non-aqueous fluids, such as hydrocarbon oils, or other organic materials such as glycols or poly(ethylene glycol) materials. Aqueous fluids, which typically include various amounts and types of organic solvents or polymers dissolved or dispersed in water.

A difficulty in current cutting wire technology is the increasing cost for disposal of spent cutting fluids, and the concern about environmental impacts depending on method chosen for such disposal.

Another difficulty in current cutting wire technology relates to the heat and shear force generated during the course of cutting a workpiece. This heat and shear force arises not only from the friction that is essential for the cutting process at the cutting interface between cutting wire, abrasive particles, and substrate surface, but also from the pumping mechanism and conduit used in delivering the cutting fluid slurry to the cutting interface. The heat and shear force can compromise the integrity of the organic materials present in an aqueous cutting fluid slurry, particularly polymeric materials that are typically added to the fluid to provide a sufficient viscosity to keep the abrasive particles uniformly dispersed and to aid in adhering the cutting fluid to the cutting wire. Break down of polymers having a weight average molecular weight of about 200 kiloDaltons (kDa) or greater is particularly problematic, since such polymers are typically used in relatively small amounts, and reductions in molecular weight due to shear dramatically reduce the viscosity of the cutting fluid. Shear forces occur at the cutting surface as well as inn the pumps and nozzles used to apply the cutting fluid to the wire.

There is an ongoing need for aqueous cutting fluids having relatively high water content, for good cooling ability, while still having sufficient viscosity to maintain abrasive particles as a uniform suspension and adhere the fluid to the cutting wire over many recycle iterations.

The present invention set forth herein below is a useful addition to the field of wiresaw cutting technology.

BRIEF SUMMARY OF THE INVENTION

A wiresaw cutting fluid composition of the present invention comprises about 25 to about 75% by weight of a particulate abrasive suspended in an aqueous carrier containing a polymeric viscosity modifier. The viscosity modifier comprises a polymer including a majority of non-ionic monomer units on a molar basis (e.g., at least about 50 or 60 mol % non-ionic monomer units), has a number average molecular weight ($M_n$) of at least about 5 kDa, and is present in the aqueous carrier at a concentration sufficient to provide a Brookfield viscosity for the composition in the range of about 50 to about 1000 centiPoise (cP), e.g. about 50 to about 700 cP at about 25° C. at a spindle rotation rate of about 60 revolutions-per-minute (rpm). In some preferred embodiments the viscosity modifier is moderately shear thinning. In one embodiment, the viscosity modifier comprises a non-ionic polymer, has a weight average molecular weight ($M_w$) of about 20 to about 200 kDa, and is present in the aqueous carrier at a concentration sufficient to provide a composition Brookfield viscosity in the range of about 75 to about 700 cP at about 25° C. at a spindle rotation rate of about 60 rpm. In another embodiment, the viscosity modifier has an $M_w$ of at least about 200 kDa.

When a viscosity modifier of 200 kDa or greater $M_w$ is utilized in a cutting fluid of the present invention, a preferred wiresaw cutting process involves recirculating the cutting fluid with a pumping and distribution system that operates under relatively low shear conditions. In such cases the aqueous cutting fluid slurry is applied to the wiresaw from a recirculating reservoir in which the cutting fluid slurry is circulated and applied by pumps and nozzles operating at a relatively low shear rate of not more than about $10^4$ s$^{-1}$, preferably not more than about $10^3$ s$^{-1}$.

DETAILED DESCRIPTION OF PREFERRED EMBODIMENTS

The wiresaw cutting fluids of the present invention are aqueous slurries of an abrasive suspended in an aqueous carrier containing a polymeric viscosity modifier. The viscosity modifier is present in the aqueous carrier at a concentration sufficient to maintain the viscosity of the composition within an optimal range of viscosity (e.g., a composition viscosity of about 50 to about 1000 cP, e.g., about 75 to 700 cP, as determined by Brookfield viscometry at about 25° C. at a spindle rotation rate of about 60 rpm). The viscosity of the carrier aids in suspending the abrasive particles in the carrier and facilitates adhesion of the cutting fluid to the cutting wire. Preferably, the concentration of viscosity modifier is sufficient to maintain the viscosity of the cutting fluid composition in the range of about 150 to about 500 cP.

The compositions of the present invention comprise at least about 25 percent by weight abrasive particles that are relatively uniformly dispersed and suspended in the aqueous carrier of the cutting fluid. Preferably, the cutting fluid comprises not more than about 75 percent by weight of abrasive. In some preferred embodiments, the abrasive is present in the composition at a concentration of about 35 to about 70 percent by weight, preferably 40 to 60 percent by weight (e.g., about 50%), based on the total composition weight.

The two components of the cutting slurry, i.e., the abrasive particles and the carrier, can be packaged and stored separately or together, and preferably are packaged and stored separately. When a user is scheduling a cutting procedure in the near future, the abrasive particles and the carrier can be combined in advance of the time when the cutting slurry is scheduled to be used. The time in advance for combining the two components can be, for example, the day of the cutting procedure up to about a year prior to the scheduled cutting procedure, more preferably up to about six months prior, even more preferably up to about one month prior.

Preferably, the combination of abrasive and carrier provides a colloidally stable suspension. As used herein, the term "colloidally stable", and grammatical variations thereof, refers to the maintenance of a suspension of particles over time. In the context of this invention, an abrasive suspension is considered colloidally stable if, when the abrasive is placed into a 100 mL graduated cylinder and allowed to stand without agitation for a time of 2 hours, the difference between the concentration of particles in the bottom 50 mL of the graduated cylinder ([B] in terms of g/mL) and the concentration of particles in the top 50 mL of the graduated cylinder ([T] in terms of g/mL) divided by the total concentration of particles in the abrasive composition ([C] in terms of g/mL) is less than or equal to 0.5 (i.e., ([B]−[T])/[C]≦0.5). The value of ([B]−[T])/[C] desirably is less than or equal to 0.3, and preferably is less than or equal to 0.1.

The abrasive particles preferably have an average particle size in the range of about 1 to about 500 micrometers, e.g., as determined by sieving, light scattering, or any other method known in the particle characterization arts. In some embodiments the average particle size of the abrasive is about 2 um to about 25 μm, preferably about 4 μm to about 16 μm, and more preferably from about 6 μm to about 16 μm. As generally employed in generating cutting slurries, the abrasive particles are generated and isolated to have an average diameter that is substantially uniform, such as, for example, an average diameter that has a range of plus or minus no more than about 50%, no more than 40%, no more than about 30%, no more than about 20%, no more than about 10%, or no more than about 5%. For example, an abrasive particle preparation having an average diameter of about 10 μm can have a range of diameters of about 5 μm to about 15 μm, about 6 μm to about 14 μm, about 7 μm to about 13 μm, about 8 μm to about 12 μm, about 9 μm to about 11 μm, or about 9.5 μm to about 10.5 μm.

The abrasive is selected based on the hardness of the substrate boule that is to be cut. Generally, the abrasive particles with have a Mohs hardness of at least about 7.5, preferably 8 to 10. Suitable abrasive materials include, without limitation, silicon carbide (SiC), silicon nitride, diamond, tungsten carbide, boron carbide ($B_4C$), cubic boron nitride (CBN), boron nitride, α-alumina, aluminum oxide, zirconium oxide, tungsten carbide, carborundum, corundum powder, or any other abrasive of similar Mohs hardness. A preferred abrasive for cutting semiconductor substrates is silicon carbide, or diamond.

While a high water content is beneficial and desirable for improved cooling efficiency, hydrogen generation due to reduction of water by reactive metals or metaloids, such as silicon, can be a significant problem in wiresaw processes that utilize an aqueous cutting fluid composition. Hydrogen that is generated during a wiresaw cutting process can present an explosion hazard and contributes to undesirable foaming. We have discovered that there is a dramatic increase in hydrogen formation (e.g., due to reduction of water by silicon) in conventional aqueous wiresaw cutting fluids comprising about 55% by weight water or greater compared to compositions containing less than 55 weight % water. For example, about 0.28 mL/min of $H_2$ was generated by a 50:50 (wt/wt) mixture of water and polyethylene glycol (PEG 300, molecular weight about 300) when stirred with silicon powder (to simulate wiresaw cutting), compared to 0.94 mL/min for a 58:42 (wt/wt) mixture of water and polyethylene glycol, 1.19 mL/min for a 65:35 (wt/wt) water and polyethylene glycol mixture, 1.125 mL/min for a 75:25 (wt/wt) mixture, and 1.70 mL/min for pure water.

Surprisingly, the compositions of the present invention exhibit acceptably low hydrogen generation rates (e.g., generally not more than about 0.75 mL/min, preferably not more than about 0.3 mL/min) when exposed to silicon even at water levels of 55% by weight and above. Accordingly, the aqueous carrier in the compositions of the present invention preferably comprises at least about 55% by weight of water (e.g., deionized water) based on the combined weight of the non-abrasive components of the composition, e.g., water may comprise about 50 to about 98 weight % of the carrier. Preferably, the carrier comprises at least about 75% by weight water (preferably at least about 85%), based on the combined weight of the non-abrasive components of the composition. Using a water-based carrier provides improved heat retention and cooling characteristics to the cutting slurry than exists for previously disclosed non-aqueous cutting slurries that include oil-based or primarily poly(ethylene glycol) (PEG) components. For example, a water-based cutting slurry cools by water evaporation that occurs under ambient conditions. Another benefit of the aqueous nature of the cutting slurry of the present invention is that it is more environmentally friendly than non-aqueous alternatives currently used due to issues concerning breakdown of organic solvents, impact of organic solvents on the biosphere, and the like.

The carrier also includes at least one polymeric viscosity modifier (thickening agent). The viscosity modifier can be a non-ionic polymer, or a substantially non-ionic polymer, e.g., a copolymer comprising a majority of non-ionic monomer units on a monomer mole basis, preferably comprising at least about 60% non-ionic monomer units (e.g., at least about 70, 75, 80, 85, 90, or 95% non-ionic monomer units). Non-ionic polymers are preferred. The viscosity modifier has a weight average molecular weight of at least about 5 kDa, as determined by gel permeation chromatography (GPC), viscometric, or light scattering techniques that are well known in the polymer arts. In some preferred embodiments the viscosity modifier has a weight average molecular weight in the range of about 50 to about 200 kDa, while in other preferred embodiments, the viscosity modifier has a weight average molecular weight of at least about 200 kDa (e.g., about 300 to about 1000 kDa).

In some embodiments, the viscosity modifier provides a composition moderately shear thinning rheology. As used herein and in the appended claims, the term "moderately shear thinning" refers to the characteristic of high viscosity at low sheer and somewhat reduced viscosity at moderate to high sheer conditions, such as that experienced in the context of a wire saw operation. In the particular context of the present invention, shear thinning is quantified by measuring the viscosity at low shear (i.e., about 10 $sec^{-1}$) and at moderate shear values (about 1000 $sec^{-1}$) and determining the % drop in viscosity as the shear is increased. A viscosity modifier is "moderately shear thinning" when the viscosity at the moderate shear level at least about 45%, preferably at least about 55% of the viscosity measured at low shear. A higher level of shear thinning is less desirable, since the interface between the cutting wire and the workpiece being cut is a relatively high shear environment. Excessive thinning at this interface can lead to excessive wire movement, which causes undesirable wire marks on the cut surface of the workpiece. Moderately shear thinning viscosity modifiers utilized in the compositions of the present invention have been found to provide surprisingly improved cutting rates compared to compositions containing viscosity modifiers exhibiting non-shear thinning rheology (e.g., shear thickening).

Preferred viscosity modifiers also are substantially unaffected by changes in ionic strength of the cutting slurry. It is preferred that the change in viscosity is less than about 20% upon addition of about 1% of a iron salt such as ferric nitrate.

The polymeric viscosity modifier is present in the aqueous carrier at a concentration sufficient to provide a Brookfield viscosity for the composition in the range of about 50 to about 1000 cP (e.g., about 75 to about 700 cP) at about 25° C. using an appropriate spindle with a rotation rate of about 60 rpm, preferably about 150 to about 500 cP. Typically, the viscosity modifier is present in the aqueous carrier in an amount of about 15% by weight or less. In some preferred embodiments, the viscosity modifier is present in the aqueous carrier at a concentration of about 0.01 to about 15% by weight, more preferably about 0.1 to about 12% by weight (e.g., about 0.5 to about 10% by weight, 1 to about 7% by weight, or about 2 to about 5% by weight).

Preferred non-ionic viscosity modifiers include, without limitation, non-ionic polymers selected from the group consisting of (a) a polysaccharide, which can be optionally substituted with at least one alkyl group (e.g., methyl, ethyl, propyl, $C_4$-$C_{20}$ alkyl, etc.), hydroxyalkyl group (e.g., hydroxymethyl, hydroxyethyl, hydroxypropyl, etc.), alkoxyalkyl group (e.g., methoxymethyl, methoxyethyl, methoxypropyl, ethoxymethyl, ethoxyethyl, ethoxypropyl, etc.), or a combination of two or more such groups (e.g., cetyl hydroxyethyl, methyl hydroxypropyl, etc.); (b) a polyvinylpyrrolidone, (c) a polyvinylalcohol, and (d) a combination of two or more of the foregoing. Preferably the viscosity modifier comprises a polysaccharide or a polysaccharide that is substituted with at least one substituent selected from the group consisting of an alkyl group, a hydroxyalkyl group, and an alkoxyalkyl group. Preferred polysaccharides include, without limitation, xanthan gums, guar gums, a starches, cellulose, and a combination of two or more of the foregoing. A more preferred polysaccharide is a cellulose derivative and a particularly preferred viscosity modifier is hydroxyethylcellulose.

Copolymers of such non-ionic materials including up to 40% by weight of charge-bearing monomer units such as acidic or basic monomer units that are respectively anionic and cationic in aqueous solutions, so long as the polymer retains shear thinning rheology characteristics. Examples of anionic monomer units include, without limitation carboxylic acid-bearing monomeric units (e.g., monomeric units derived from acrylic acid, maleic acid, methacrylic acid, and the like), sulfonic acid-bearing monomeric (e.g., derived from styrene sulfonic acid), and the like. Non-limiting examples of cationic monomeric units include tertiary amine-bearing monomers units (e.g., derived from N—(N,N-dimethylaminopropyl)acrylamide, and the like), quaternary amine-bearing monomer units (e.g., derived from an acrylamidopropyl-N,N,N-trimethylammonium salt, and the like), and the like.

In addition to the viscosity modifier, the aqueous carrier can also include other additives such as an anti-drying agent, a surfactant, a second polymeric material, a preservative, a corrosion inhibitor, and/or an anti-foaming agent Non-limiting examples of useful biocides include sodium chlorite, sodium hypochlorite, tetramethylammonium chloride, tetraethylammonium chloride, tetrapropylammonium chloride, tetrapropylammonium chloride, alkylbenzyldimethylammonium chloride, alkylbenzyldimethylammonium hydroxide, isothiazolinones, and 10-(3-chloroallyl)-3,5,7-triaza-1-azoniaadamantane chloride.

Non-limiting examples of suitable anti-drying agents include alcohols and polyols such as ethylene glycol, propylene glycol, and a poly(alkylene glycol) having a number average molecular weight of less than about 2 kDa, e.g., a poly(ethylene glycol), a poly(propylene glycol) or an ethylene glycol-propylene glycol copolymer.

Non-limiting examples of suitable surfactants include acetylenic surfactants (e.g., an acetylenic diol, or an ethoxylated acetylenic diol).

In some preferred embodiments, the aqueous carrier contains at least one additional polymer selected from a cationic polymer, an anionic polymer, a polysiloxane, a hydrophobically modified non-ionic polymer, and a urethane polymer (e.g., a polyether urea polyurethane or a hydrophobically modified urethane, such as a polyethylene oxide urethane). Examples of anionic polymers include polyacrylic acid, polymethacrylic acid, carrageenan (a sulfated polysaccharide), polystyrene sulfonic acids, and copolymers including carboxylated or sulfonated monomer units. Examples of cationic polymers include polyethylene imine, polydiallyldimethylammonium salts, and polydialkylaminoacrylates.

Certain cutting fluids in the prior art utilize clay materials, such as bentonite, LAPONITE® smectite clays, and the like, as thickeners. In wafering applications, the use of clays can be problematic, since metal ions generated by wear of the cutting wire can infiltrate the clay and disrupt the clay structure. Accordingly, it is preferred that the composition is substantially free from clay (e.g. not more than 20% of the Brookfield viscosity in the slurry is derived from the clay) and it is more preferred that the slurry is free from clay materials.

In certain embodiments, the wiresaw cutting equipment used in the methods of this invention do not depart necessarily from equipment, except to the extent set forth herein. In other embodiments, the pumps and nozzles used to deliver the cutting fluid to the wiresaw are designed to operate under relatively moderate to low shear levels.

In another aspect, the present invention provides a wiresaw cutting method comprising cutting a workpiece with a wiresaw while applying a cutting fluid composition of the present invention to the wiresaw to aid in cutting and cooling the workpiece. It has been observed that the polymers having a $M_w$ of about 150 kDa or greater, especially about 200 kDa or greater are often fragmented by the shearing from the pumping and cutting action during wire sawing, resulting in a lower $M_w$ value and a reduced viscosity. Accordingly, a preferred method embodiment of the present invention provides an improved wiresaw cutting method that minimizes shear forces experienced by cutting fluids containing such high $M_w$ viscosity modifiers, i.e., containing viscosity modifiers having an $M_w$ of about 200 kDa or greater (e.g., about 200 to about 2000 kDa, or about 200 kDa to about 1200 kDa), or about 300 kDa or greater (e.g., about 300 kDa to about 1000 kDa). The method comprises cutting a workpiece with a wiresaw while applying an aqueous cutting fluid of claim 24 to the wiresaw from a recirculating reservoir of cutting fluid, wherein the cutting fluid is circulated and applied by pumps and nozzles operating at a relatively low shear rate of not more than about $10^4$ s$^{-1}$, preferably not more than about $10^3$ s$^{-1}$. Preferred pumps include plunger pumps, progressive cavity pumps and diaphragm pumps. To further reduce shear rates, instead of one large main pump, a bank of smaller pumps in a multibranch system can be employed while maintaining pressure and flow rate control.

The workpiece or boule subjected to the cutting methods of the present invention can be composed of any material. Preferably, the boule comprises one or more of silicon, sapphire, silicon carbide, aluminum nitride, tellurium, silica, gallium arsenide, indium phosphide, cadmium sulfide, germanium, zinc sulfide, gray tin, selenium, boron, silver iodide, and indium antimonide, among other materials, and the resultant objects from the wire sawing are wafered substrates composed of the indicated material. More preferably, the boule comprises silicon or sapphire. Most preferably, the boule is silicon.

The wiresaw employed in the context of the inventive methods preferably utilizes a cutting wire having a diameter of about 50-300 μm. The material used to form the cutting wire can be any metal or composite material. Preferably, the material is steel, stainless steel, coated steel, or stainless steel with metal cladding; more preferably, the material is steel or coated steel.

Preferred embodiments of the present invention have been described herein as being applied to wire saws as are currently available in the art, and are further exemplified by the examples that follow. However, the present invention is in no way limited to those specific preferred embodiments as set forth herein above or exemplified below in any way. The contents of all cited references (including literature references, issued patents, and published patent applications) as cited throughout this application are hereby expressly incorporated by reference. The practice of the present invention will employ, unless otherwise indicated, conventional techniques that are within the skill of the art. Such techniques are explained fully in the literature available to the art.

The following examples are provided to illustrate certain aspects of the present invention. These examples are not to be construed as limiting the present invention in any way.

EXAMPLE 1

Various carrier compositions were prepared, as follows: (a) ethylene glycol (EG)-control; (b) 0.2% (wt/wt) polyacrylic acid, $M_v$ about 125K (PAA125K); (c) 0.35% (wt/wt) xanthan gum (XG); (d) 0.5% (wt/wt) hydroxyethylcellulose, $M_v$ about 125K (HEC), (e) 5% (wt/wt) polyvinylpyrrolidone K 90 (PVP90K). The aqueous carrier compositions (i.e., carrier solutions just described) were prepared with deionized water at a pH of about 7. At sheer rate about 400 sec$^{-1}$, and 25° C., the carrier solutions respectively have the following viscosity measurements for the respective viscosity modifiers (thickening agents): (A) EG, 14.0 cP; (B) PAA125K, 24.0 cP; (C) XG, 17.2 cP; (D) HEC, 14.3 cP; and (E) PVP90K, 14.3 cP. These measurements were taken with an Ares fluid rheometer (Rheometric Scientific Inc., Piscataway, N.J.) using a cup.

To each of the respective carrier solutions, a cutting slurry was formed by adding a 1:1 ratio by weight of α-silicon carbide (SiC), i.e., each cutting slurry was about 50% SiC by weight. The α-silicon carbide utilized in the cutting slurry is purchased from Tianjin Peng Zhan Chemical Import-Export Co., Ltd. (Tianjin, China). The average particle size ($D_v$ (50%)) of the α-silicon carbide particles used in the cutting slurry was 10.6 μm, as measured by a Horiba LA-910 particle size distribution analyzer (Horiba, Ltd.). The Brookfield viscosity (60 rpm, about 18° C.) of each carrier and slurry was measured as shown in Table 1.

Each of the cutting slurries was employed with a single wiresaw having a 0.2 mm stainless steel cutting wire mounted thereon (Model SXJ-2 from MTI Corporation, Richmond, Calif.). A wafer was cut from a crystalline silicon boule having approximate cutting area dimensions of 490 mm$^2$ using the wiresaw and the various cutting slurries. The observed rate of cutting (mm$^2$/min) is recorded in Table 1.

TABLE 1

| Cutting Slurry | Rate of Cutting (mm²/min) | Average Rate | Difference from Control (%) | 50% SiC slurry viscosity (cP) |
|---|---|---|---|---|
| SiC/EG-Control | 55 | 55 | Not applicable | 89 |
| Duplicate | 55 | | | |
| SiC/PAA 125K | 41 | 41 | −25 | 161 |
| SiC/XG | 61 | 64 | 16 | 462 |
| Duplicate | 67 | | | |
| SiC/HEC | 63 | 62 | 13 | 123 |
| Duplicate | 61 | | | |
| SiC/PVP 90K | 43 | 43 | −22 | 66 |

The results in Table 1 indicate that the cutting rate was increased by about 13% to about 16% when a polysaccharide such as 0.35% XG or 0.5% HEC was included in the SiC-aqueous cutting slurry formulations relative to the control SiC-ethylene glycol cutting slurry containing no thickening agent. Additionally, when the carrier solution included PVP and had a viscosity of 66 cP the cutting rate is decreased relative to the control. PAA 125K, a polyvalent dispersant, also failed to provide an enhanced cutting rate

EXAMPLE 2

This example illustrates the effect of certain polymeric viscosity modifiers having different average molecular weight characteristics on the settling of silicon carbide (SiC) abrasive particles, where the viscosity modifiers tested were included at varying concentrations in the aqueous carrier.

A 50% (w/w) SiC slurry was generated by combining equal weights of SiC abrasive particles (having an approximate largest dimension of 12 μm) and an aqueous carrier including a viscosity modifier (thickening agent) and deionized water. The percentage (v/v) of viscosity modifier in each carrier is noted in Table 2. The various viscosity modifiers evaluated in this example were non-ionic polymers, i.e.: polyvinylpyrrolidone (PVP K-120); methyl cellulose; hydroxypropylcellulose; hydroxyethylcellulose (HEC); and polyethylene glycol. The Brookfield viscosity (60 rpm, about 18° C.) of each carrier and slurry was measured as shown in Table 2.

Each of the 50% SiC slurries was agitated such that the SiC abrasive particles were maximally suspended in the respective carrier, after which a sample of each was placed separately into a 50 or 100 ml graduated cylinder. The slurry was left without agitation for about 17 hours such that the SiC abrasive particles were allowed to settle, after which the amount of cleared carrier solution at the top was observed. The results are set forth in Table 2.

TABLE 2

| Non-Ionic Polymer ("NIP") | NIP Molecular Weight Avg (×1000) | Concentration of NIP in water (Carrier) | Carrier Viscosity (cP) | 50% SiC slurry Viscosity (cP) | Settling Stability |
|---|---|---|---|---|---|
| PVP K-120 | 3000 | 4% | 42 | 177 | good |
| PVP K-90 | 1200 | 10% | 180 | 550 | very good |
| Methyl Cellulose | 86 | 0.60% | 40 | 150 | good |
| Methyl Cellulose | 63 | 0.80% | 113 | 548 | very good |
| Hydroxypropyl Cellulose | 80 | 4% | 27 | 170 | good |
| Hydroxypropyl Cellulose | 100 | 6% | 147 | 688 | very good |
| Hydroxypropyl Cellulose | 100 | 4% | 30 | 182 | good |
| Hydroxypropyl Cellulose | 370 | 2% | N.A. | 239 | very good |
| Hydroxyethyl Cellulose | 90 | 6% | 153 | 710 | very good |
| Hydroxyethyl Cellulose | 90 | 4% | 52 | 269 | good |
| Hydroxyethyl Cellulose | 300 | 2% | 156 | 445 | very good |
| Hydroxyethyl Cellulose | 720 | 0.50% | 51 | 227 | good |
| Polyethylene Glycol | 0.3 | 100% (i.e., no water) | 70 | 353 | very good |
| Water (control) | | | 1 | 4 | poor |

All of the tested carriers (apart from the control—water) provided useful colloidal suspension characteristics. The water control demonstrated an inability to preserve the colloidal characteristics of the slurry in the shortest time, and, as expected, was not a useful for generating slurries. The prior art slurry of 50% SiC in PEG showed useful settling performance (in that the slurry settled at a sufficiently slow rate). The viscosity of the PEG slurry was 353 cP. It is of interest in the context of noted advantages of the slurries described here that a slurry viscosity substantially less than that of the PEG slurry demonstrated similar settling performance. For example, the 50% SiC slurry made in 2% hydroxypropyl cellulose ($M_w$=370K) was shown to have a viscosity of 239 cP, i.e., the hydroxypropyl cellulose-based slurry had a viscosity that is two-thirds that of the PEG-based slurry.

EXAMPLE 3

This example illustrates the effect of certain polymeric viscosity modifiers having different average molecular weight characteristics on the stability of the viscosity under high shear conditions which model the shearing during wire saw operation. A 50% (w/w) SiC slurry was generated by combining equal weights of SiC abrasive particles and an aqueous carrier including a viscosity modifier (thickening agent) and deionized water as described in Table 3. OPTIFLO® L100 and OPTIFLO® H370 are non-ionic polymers having a polyether with hydrophobic groups attached (also described as hydrophobic ethoxylated aminoplast). OPTIFLO® M2600 is a hydrophobic ethoxylated urethane. The viscosity was measured (Brookfield viscometer, 60 rpm, about 18° C.) of each slurry before and shortly after shearing 250 ml in a 1 L Waring blender (model 51BL31, made by Waring Commercial, Torringtom Conn.) mixing at 18000 rpm for 10 min.

TABLE 3

| # | Additives in carrier | NIP Molecular Weight Avg (×1000) | Slurry viscosity before shear (cP) | Slurry viscosity after shear (cP) | % drop |
|---|---|---|---|---|---|
| 1 | OPTIFLO® L100, 9.5% | ~40 | 919 | 758 | 18% |
| 2 | OPTIFLO® M2600, 2.9% | ~40 | 611 | 424 | 31% |
| 3 | OPTIFLO® H370, 2.0% | ~40 | 621 | 305 | 51% |
| 4 | PVP K90, 10% | 1200 | 557 | 320 | 43% |
| 5 | LAPONITE® RD 2.5% | NA | 496 | 48 | 90% |
| 6 | OPTIGEL® LX 1.3% | NA | 480 | 100 | 79% |
| 7 | HEC 5.5% | 90 | 386 | 283 | 27% |
| 8 | Xanthan gum 0.3% | >1000 | 276 | 52 | 81% |

This data demonstrates that non-ionic polymers that have a high molecular weight degrade more and that to minimize the viscosity loss it is best to keep the molecular weight under 200 kDa. This data also demonstrates that a synthetic magnesium silicate clay such as LAPONITE® RD and a organic modified clay such as OPTIGEL® LX also show substantial viscosity loss.

EXAMPLE 4

This example illustrates the effect of a blend of non-ionic polymeric viscosity modifiers having different average molecular weight characteristics on the viscosity in various shear conditions.

A 50% (w/w) SiC slurry was generated by combining equal weights of SiC abrasive particles and an aqueous carrier including a blend of two viscosity modifier (thickening agent) and deionized water as described in Table 3. The polymers are hydroxyethyl cellulose with a Mw of 86 kDa (HEC low) and Mw of 306 kDa (HEC high) as measured by GPC standardized with polyacrylic acid standards. All carriers also had 6% polyethylene glycol (Mw=300), 1% non-polymeric surfactant and 20 ppm of a isothiazoline biocide. The viscosity was measured with an Ares rheometer (Rheometric Scientific Inc., Piscataway, N.J.) using a couette geometry and measuring the viscosity at 40° C. with a shear rate of $10\ s^{-1}$ and $1000\ s^{-1}$. The settling was evaluated by placing a 100 ml sample of each slurry into a 100 ml graduated cylinder. The slurry was left without agitation for 24 hours such that the SiC abrasive particles were allowed to settle, after which the amount (ml) of clear carrier solution at the top was observed.

TABLE 4

| # | HEC low | HEC high | viscosity at 10 s – 1 | viscosity at 1000 s – 1 | % viscosity remaining | Settling 24 hr |
|---|---|---|---|---|---|---|
| 1 | 1.0% | 1.00% | 238 | 91 | 38% | 10 |
| 2 | 2.0% | 0.66% | 241 | 109 | 45% | 8 |
| 3 | 3.0% | 0.35% | 251 | 127 | 51% | 6 |
| 4 | 4.0% | 0.00% | 251 | 140 | 56% | 6 |

This data shows that blends of two polymers can be effective in suspending the abrasive and that it is preferred to have a higher percentage of lower molecular weight polymer in order to have the lowest drop in viscosity as the shear is increased.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed:

1. A wiresaw cutting fluid composition comprising about 25 to about 75% by weight of a particulate abrasive suspended in an aqueous carrier containing a polymeric viscosity modifier;
wherein the viscosity modifier comprises a polymer including a majority of non-ionic monomer units on a monomer mole basis, has a number average molecular weight ($M_n$) of at least about 5 kiloDaltons (kDa), and is present in the aqueous carrier at a concentration sufficient to provide a Brookfield viscosity for the composition in the range of about 50 to about 1000 centiPoise (cP) at about 25° C. at a spindle rotation rate of about 60 revolutions-per-minute (rpm); and wherein the composition is substantially free from clay materials.

2. The composition of claim 1 wherein the viscosity modifier is a non-ionic polymer.

3. The composition of claim 2 wherein the non-ionic polymer is selected from the group consisting of (c) a polysaccharide that is optionally substituted with at least one alkyl group, hydroxyalkyl group, alkoxyalkyl group, or a combination of two or more such groups; (b) a polyvinylpyrrolidone, (c) a polyvinylalcohol, and (d) a combination of two or more of the foregoing.

4. The composition of claim 2 wherein the viscosity modifier comprises a polysaccharide that is optionally substituted with at least one substituent selected from the group consisting of an alkyl group, a hydroxyalkyl group, and an alkoxyalkyl group.

5. The composition of claim 4 wherein the polysaccharide is selected from the group consisting of a xanthan gum, a guar gum, a starch, a cellulose, and a combination of two or more of the foregoing.

6. The composition of claim 1 wherein the viscosity modifier comprises hydroxyethylcellulose.

7. The composition of claim 6, wherein the hydroxyethylcellulose has a weight average molecular weight ($M_w$) in the range of about 20 to about 100 kDa.

8. The composition of claim 1 wherein the viscosity modifier has an $M_w$ in the range of about 20 to about 200 kDa.

9. The composition of claim 1 wherein the viscosity modifier has an $M_w$ in the range of about 20 to about 70 kDa.

10. The composition of claim 1 wherein the viscosity modifier is present in the aqueous carrier at a concentration of about 0.01 to about 15% by weight.

11. The composition of claim 1 wherein the viscosity modifier is moderately shear thinning, providing a carrier viscosity measured at a moderate shear rate of about $1000$ s$^{-1}$ that is not less than about 55% of the carrier viscosity measured at a low shear rate of about $10$ s$^{-1}$.

12. The composition of claim 1 wherein the abrasive has a Mohs hardness of at least about 7.5.

13. The composition of claim 1 wherein the abrasive comprises silicon carbide.

14. The composition of claim 1 wherein the abrasive has a mean particle size in the range of about 1 to about 500 micrometers.

15. The composition of claim 1 wherein the aqueous carrier has an acidic pH.

16. The composition of claim 1 wherein the aqueous carrier comprises at least about 55% by weight water.

17. The composition of claim 1 wherein the aqueous carrier contains a water soluble polyol anti-drying agent.

18. The composition of claim 17 wherein the anti-drying agent comprises a poly(alkylene glycol) having a number average molecular weight of less than about 2 kDa.

19. The composition of claim 1 wherein the aqueous carrier contains a surfactant.

20. The composition of claim 19 wherein the surfactant comprises an acetylenic surfactant.

21. The composition of claim 1 wherein the aqueous carrier contains at least one additional polymer selected from a cationic polymer, an anionic polymer, a polysiloxane, a hydrophobically modified non-ionic polymer, and a polyether urea polyurethane.

22. The composition of claim 1 wherein the composition is free from clay materials.

23. The composition of claim 1 wherein the viscosity modifier comprises a non-ionic polymer having an $M_w$ in the range of about 20 to about 200 kDa, and is present in the aqueous carrier at a concentration sufficient to provide a Brookfield viscosity for the composition in the range of about 75 to about 700 cP at about 25° C. at a spindle rotation rate of about 60 rpm.

24. The composition of claim 1 wherein the viscosity modifier comprises a copolymer comprising at least about 60 mol % non-ionic monomer units.

25. A wiresaw cutting fluid composition comprising about 25 to about 75% by weight of a particulate abrasive suspended in an aqueous carrier containing a viscosity modifier; wherein the viscosity modifier comprises a polymer including a majority of non-ionic monomer units, has an $M_n$ of at least about 5 kDa, and an $M_w$ of at least about 200 kDa, and is present in the aqueous carrier at a concentration sufficient to provide a Brookfield viscosity for the composition in the range of about 50 to about 700 cP at about 25° C. at a spindle rotation rate of about 60 rpm.

26. The composition of claim 25 wherein the viscosity modifier comprises a non-ionic polymer.

27. The composition of claim 26 wherein the non-ionic polymer is selected from the group consisting of (c) a polysaccharide that is optionally substituted with at least one alkyl group, hydroxyalkyl group, alkoxyalkyl group, or a combination of two or more such groups; (b) a polyvinylpyrrolidone, (c) a polyvinylalcohol, and, (d) a combination of two or more of the foregoing.

28. The composition of claim 26 wherein the viscosity modifier comprises a polysaccharide that is optionally substituted with at least one substituent selected from the group consisting of an alkyl group, a hydroxyalkyl group, and an alkoxyalkyl group.

29. The composition of claim 28 wherein the polysaccharide is selected from the group consisting of a xanthan gum, a guar gum, a starch, a cellulose, and a combination of two or more of the foregoing.

30. The composition of claim 25 wherein the viscosity modifier comprises hydroxyethylcellulose.

31. The composition of claim 30 wherein the hydroxyethylcellulose has an $M_w$ in the range of about 300 to about 1000 kDa.

32. The composition of claim 26 wherein the non-ionic polymer has an $M_w$ in the range of about 200 to about 1200 kDa.

33. The composition of claim 25 wherein the viscosity modifier is moderately shear thinning, providing a viscosity measured at a moderate shear rate of about $1000 \text{ s}^{-1}$ that is not less than about 55% of the viscosity measured at a low shear rate of about $10 \text{ s}^{-1}$.

34. The composition of claim 25 wherein the abrasive has a Mohs hardness of at least about 7.5, and has a mean particle size in the range of about 1 to about 500 micrometers.

35. The composition of claim 25 wherein the aqueous carrier has an acidic pH.

36. The composition of claim 25 wherein the aqueous carrier contains a surfactant, a water soluble polyol anti-drying agent, at least one additional polymer selected from a cationic polymer, an anionic polymer, a polysiloxane, a hydrophobically modified non-ionic polymer, and a polyether urea polyurethane; or a combination of two or more of the foregoing.

37. A wiresaw cutting process comprising cutting a workpiece with a wiresaw while applying an aqueous cutting fluid of claim 25 to the wiresaw from a recirculating reservoir of cutting fluid, wherein the cutting fluid is circulated and applied by pumps and nozzles operating at a relatively low shear rate of not more than about $10^4 \text{ s}^{-1}$.

38. A wiresaw cutting process comprising cutting a workpiece with a wiresaw while applying an aqueous cutting fluid of claim 1 to the wiresaw from a recirculating reservoir of cutting fluid.

* * * * *